United States Patent [19]

Munck

[11] 3,915,283

[45] Oct. 28, 1975

[54] METHOD FOR CONVEYING GREEN AGGLOMERATES INCLUDING A FEED CONVEYOR, A LATERALLY RECIPROCABLE CONVEYOR AND AN ALIGNED TRANSPORT CONVEYOR

[75] Inventor: Toni Munck, Hochheim (Main), Germany

[73] Assignee: Dravo Corporation, Pittsburgh, Pa.

[22] Filed: July 20, 1971

[21] Appl. No.: 164,286

[30] Foreign Application Priority Data

July 29, 1970 Germany............................ 2037562

[52] U.S. Cl............................... 198/31 AB; 198/106
[51] Int. Cl.² ......................................... B65G 47/26
[58] Field of Search......... 198/29, 30, 31 R, 31 AA, 198/31 AB, 31 AC, 106, 42; 264/117

[56] References Cited
UNITED STATES PATENTS

| | | | |
|---|---|---|---|
| 1,292,178 | 1/1919 | Waterman...................... | 198/31 AB |
| 1,871,832 | 8/1932 | Absmeier....................... | 198/31 AB |
| 3,106,280 | 10/1963 | Baker............................ | 198/31 AB |

*Primary Examiner*—Evon C. Blunk
*Assistant Examiner*—James M. Slattery
*Attorney, Agent, or Firm*—Parmelee, Miller, Welsh & Kratz

[57] ABSTRACT

A method for conveying green agglomerates, such as pellets, is disclosed. An elongated conveyor comprising a series of parallel smooth surface rollers is provided to receive pellets discharged from a transfer conveyor arranged upstream thereof. The transfer conveyor is supported for lateral shifting with respect to the transport conveyor. A narrow feed conveyor is arranged to deposit pellets on the transfer conveyor while it is shifting laterally of the transport conveyor. Pellets are also deposited on the transport conveyor while the transfer conveyor is shifting. The feed conveyor is arranged either longitudinally or transversely with respect to the transfer conveyor.

2 Claims, 2 Drawing Figures

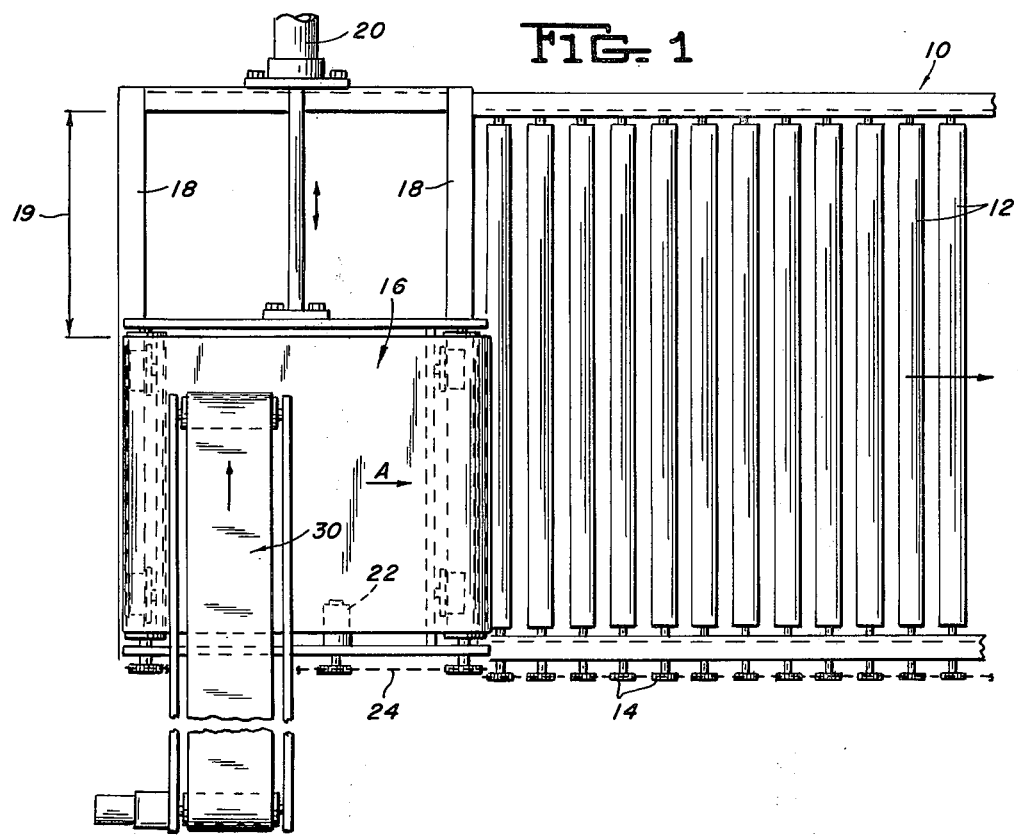
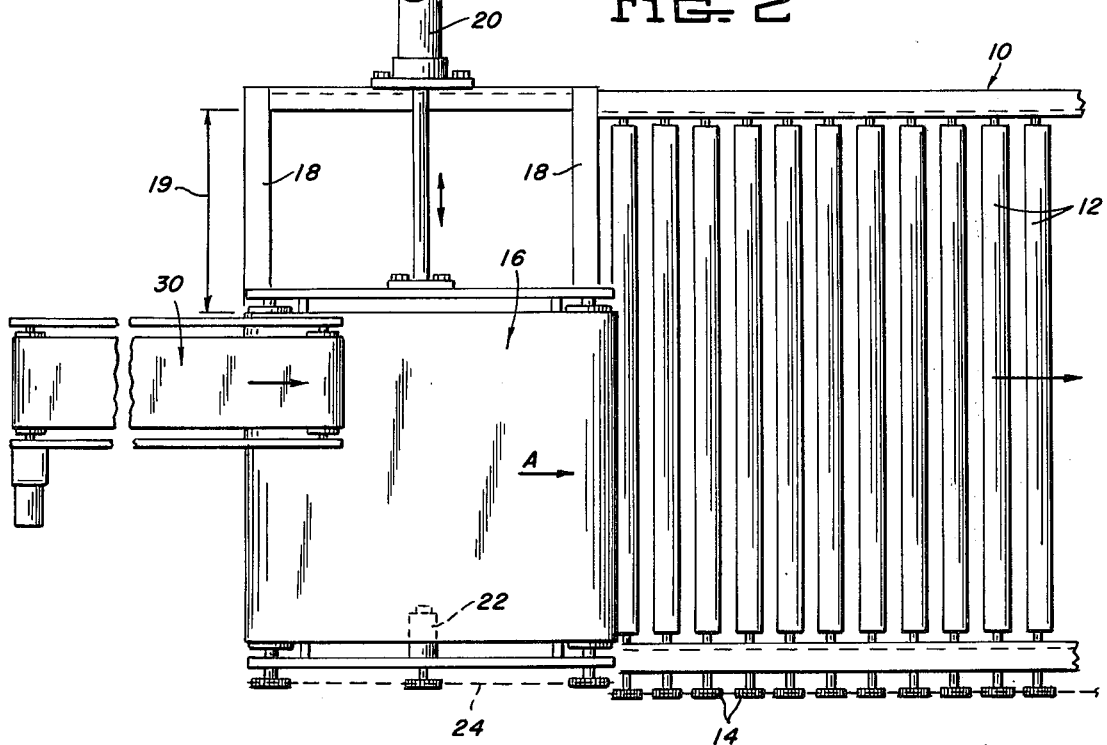

METHOD FOR CONVEYING GREEN AGGLOMERATES INCLUDING A FEED CONVEYOR, A LATERALLY RECIPROCABLE CONVEYOR AND AN ALIGNED TRANSPORT CONVEYOR

This invention relates to a method and apparatus for conveying green agglomerates such as pellets and depositing them onto a travelling grate or similar device.

The thermal treatment of green pellets on travelling grates must be preceeded by depositing of the green pellets onto grate in such a manner that uniform distribution of the pellets over the entire width of the grate is achieved. Beacuse of the low crushing strength of the green pellets after they are formed, discharging from a height above the grate, as from a hopper, is disadvantageous because of the resulting breakage of the pellets. Uniform distribution and minimized breakage is also impossible from a uniplanar conveyor having a width substantially the same as that of the travelling grate. Thus, arrangements are required which insure proper distribution of the green pellets with minimized breakage.

It is important that the green pellets be evenly distributed on the travelling grate. Slight fluctuations in the thickness of the charge of pellets, together with the inhomogeneities of the sizes of the pellets themselves, results in impairment of thermal treatment, because of the differences of permeability of the charge to the gas flowing therethrough. Therefore, as concerns the quality of production, it is extremely important for the charge on the travelling grate to exhibit a rather flat surface and for the particle spectrum of the charge to be as uniform as possible.

The system for loading green pellets onto a travelling grate most frequently used in the construction of modern pelletizing plants consists of a swinging chute or conveyor and roller conveyor arranged upstream of the grate. In such a system, the chute distributes the pellets over the width of the roller conveyor. The roller conveyor in turn achieves uniformity of thickness of the bed of material loaded upon it. The roller conveyor then deposits the uniform thick charge of pellets onto the travelling grate on which thermal treatment takes place. A typical chute-roller conveyor system is described in U.S. Pat No. 2,988,781 assigned to the assignee of the present application.

One disadvantage of depositing the green pellets onto the roller conveyor from a narrow chute is that the rate of pellets discharged from the chute is too small to permit the proper distribution of the pellets on the roller conveyor. This defect could be compensated for by providing a longer roller conveyor which solution is not satisfactory because it is expensive and takes up valuable space.

The above noted disadvantages of the known green pellet feed systems are overcome by the present invention. More particularly the present invention includes feeding apparatus which preferably comprises: an elongated transfer or shifting conveyor arranged upstream of a travelling grate or the like; actuating means supporting the shifting conveyor for movement as a unit laterally of the roller conveyor; and a feed conveyor arranged for depositing material on the shifting conveyor at any lateral position of the shifting conveyor with respect to the roller conveyor. The feed conveyor may be arranged transversely or longitudinally with respect to the shifting conveyor. In either case, the same results, to be described hereinafter, will be achieved. In addition, the shifting conveyor may be arranged to discharge onto a transport conveyor located upstream of the travelling grate whereby the transport conveyor will deposit the material onto the grate.

The principal advantage of this invention consists of the fact that as a result of the dual motion of the shifting conveyor (i.e. reciprocal lateral motion as a unit and linear motion of the conveyor), a dual distribution of the pellets takes place, once on the shifting conveyor itself and once during depositing of the pellets on the roller conveyor. Thus, the roller conveyor may be made reasonably short in length to achieve the desired thickness of the charge of pellets. Also the shifting conveyor may be made with a width of about half the width of the roller conveyor since only a slight thickness distribution of the charge need be performed thereon. It has been found that the conveyor arrangement of this invention reduces breakage of the pellets and keeps dust formation to a minimum. The transport conveyor, being preferably a roller conveyor combines the advantages of uniform distribution of the charge of pellets with the screening of the fine material between the spaced rollers.

An additional transport conveyor may be interposed between the roller conveyor and travelling grate so that the more expensive roller conveyor can concentrate on evening-out the pellet charge and sifting the fine material. It would also be advantageous for structural reasons to use the additional transport conveyor to carry the charge of pellets from the roller conveyor to the travelling grate.

Because of the dual movement of the shifting conveyor the pattern of pellets deposited thereon by the feed conveyor is in a generally zig-zag form with respect to the transfer conveyor. Thus, while the shifting conveyor is reciprocated back and forth, parallelogram-shaped strips of pellets are deposited adjacent or overlapping one another. The rate of delivery of pellets from the feed conveyor may be varied together with varying the speed of lateral travel of the shifting conveyor to effect the relationship of the strips of pellets in the following manner:

a. an intermediate space is formed between the individual strips, b. the strips are directly adjacent to one another, or c. the strips may be made to overlap.

Thus, the above possibilities of arranging the strips of pellets on the shifting conveyor are available for influencing the distribution of the green pellets on the roller conveyor.

Other details and advantages of this invention will become apparent as the following description of present preferred embodiments thereof and a preferred method of practicing same proceeds.

In the accompanying drawings I have shown present preferred embodiments and have illustrated a present preferred method of the same in which:

FIG. 1 is a plan view of the feed apparatus of the present invention in generally schematic representation, showing the stationary feed conveyor arranged generally transversely to the laterally shiftable transfer conveyor which in turn is longitudinally arranged with respect to a roller conveyor; and FIG. 2 is a plan view similar to that of FIG. 1 and showing the feed conveyor arranged generally longitudinally with respect to the transfer or shifting conveyor.

Referring to both figures of the drawings, there is shown a transport conveyor in the form of a roller conveyor 10 including a series of longitudinally spaced rollers 12 each of which is journalled for rotation about the longitudinal axis thereof by a suitable drive means, such as a motor, not shown, coupled by a drive chain or the like to the sprocket wheels 14. The roller conveyor 10 is arranged to receive pellets from a transfer or shifting conveyor 16 arranged upstream of the roller conveyor. The shifting conveyor 16 is mounted on rails 18 for movement as a unit in a transverse direction relative to the longitudinal axis of roller conveyor 10. Suitable means such as drive motor 20 are provided for moving the shifting conveyor 16 on rails 18. The distance traversed by the conveyor 16 is designated by the numeral 19. The shifting conveyor 16 is also provided with a drive means such as motor 22 and drive chain 24 for moving the shifting conveyor 16 in the direction of the roller conveyor 10, as indicated by the arrow A.

Green pellets are fed to the shifting conveyor 16 by a feed conveyor 30 shown in FIG. 1 as being arranged transversely of the shifting conveyor and in FIG. 2 as being arranged longitudinally of the shifting conveyor.

The following is an example of actual operating conditions of the apparatus previously described. A travelling grate having a width of 3.5 meters was to be covered with green pellets to a depth of 30 cm. The velocity of the travelling grate was 1.6 meters per minute. The required loading capacity was thus around 220 metric tons per hour.

The placement of the green pellets on the travelling grate was accomplished with the roller conveyor 10 having a length of 4.3 meters, with a slope of between 15° and 25° with respect to a flat travelling grate. The roller conveyor 10 was fed by a shifting conveyor 16 having a width of around 2 meters. The shifting conveyor was given ten double reciprocations per minute. The linear velocity of the shifting conveyor 16 was 0.1 meter per second.

The feed conveyor 30 had a load width of 0.59 meters and was operated at a velocity of 0.5 meters per second. The cross-section of the charge of pellets discharged by the feed conveyor 30 was approximately triangular in shape, with a base length of around 0.59 meters and a height of around 0.19 meters.

By virtue of the above conditions a rather flat charge of pellets is deposited on shifting conveyor 16. During the transfer of the pellets from shifting conveyor 16 to the roller conveyor 10, as well as during the movement of the pellets on the roller conveyor 10, and increase in the uniformity of thickness of the pellet charge was achieved in such a manner that the load on the travelling grate had a plane surface.

While I have shown and described a present preferred embodiment of this invention and have illustrated a certain present preferred method of practicing the same it is to be distinctly understood that the invention is not limited thereto, but may be otherwise variously embodied and practiced within the scope of the following claims.

I claim:

1. The method of conveying green agglomerates from a feed conveyor to a laterally reciprocable transfer conveyor and then to an aligned transport conveyor, and forming a uniformly distributed layer of green agglomerates thereon, which method comprises;
    a. continuously depositing said green agglomerates from the feed conveyor onto the laterally reciprocating transfer conveyor forming an initial agglomerate layer of an initial uniformity across the width of the transfer conveyor;
    b. advancing the initial agglomerate layer on the transfer conveyor in the direction of travel transverse to the direction of lateral reciprocation of the transfer conveyor;
    c. continuously discharging the initial agglomerate layer from the transversely reciprocating transfer conveyor onto the aligned transport conveyor to form a more uniformly distributed agglomerate layer.

2. The method as set forth in claim 1, wherein the agglomerate layer is screened while on the transport conveyor.

* * * * *